WINDOW CONSTRUCTION

Original Filed Oct. 11, 1933 2 Sheets-Sheet 1

INVENTORS
Edmund Peremi
Louis Toth
BY Blair, Curtis + Hayward
ATTORNEYS

WINDOW CONSTRUCTION
Original Filed Oct. 11, 1933 2 Sheets-Sheet 2
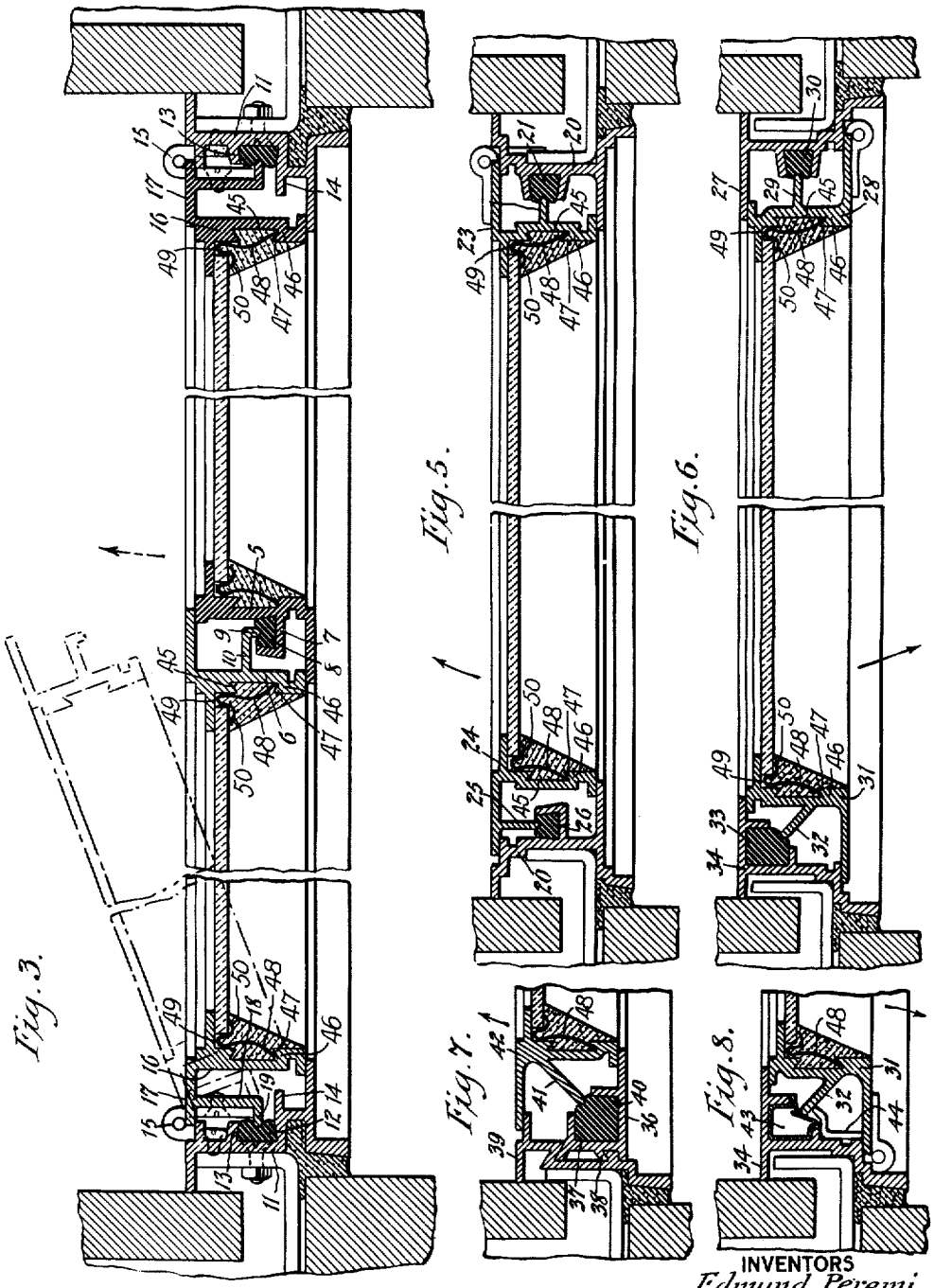
INVENTORS
Edmund Peremi
Louis Toth
BY
Blair, Curtis & Hayward
ATTORNEYS Reissued October 19, 1948 Re. 23,045

UNITED STATES PATENT OFFICE 23,045

WINDOW CONSTRUCTION

Edmund Peremi, Bayside, Long Island, and Louis Toth, Flushing, N. Y., assignors, by mesne assignments, to Reconstruction Finance Corporation, New York, N. Y., a corporation of the United States of America Original No. 2,077,807, dated April 20, 1937, Serial No. 693,199, October 11, 1933. Application for reissue April 22, 1948, Serial No. 22,668

11 Claims. (Cl. 189—69)

This invention relates to window constructions, an object of the invention being to provide a window construction of the hinged sash or casement type, in which the bars of the frame have at least three-point contacts throughout, one of said contacts constituting a weather-strip whereby the window is rendered weatherproof.

A further object of the invention is to provide a window construction embodying novel shapes of sash bars and frame bars, all of which will be more fully hereinafter described and pointed out in the claims.

In the accompanying drawings—

Figure 3 is an enlarged broken view in horizontal section on the line 3—3 of Figure 1;

Figure 5 is an enlarged broken view in horizontal section on the line 5—5 of Figure 4;

Figure 6 is a view similar to Figure 5 illustrating a modified construction wherein the sash swings outwardly instead of inwardly, as in Figure 5;

Figures 7 and 8 are fragmentary views in cross section illustrating modified shapes of sash and frame bars.

Figure 2:
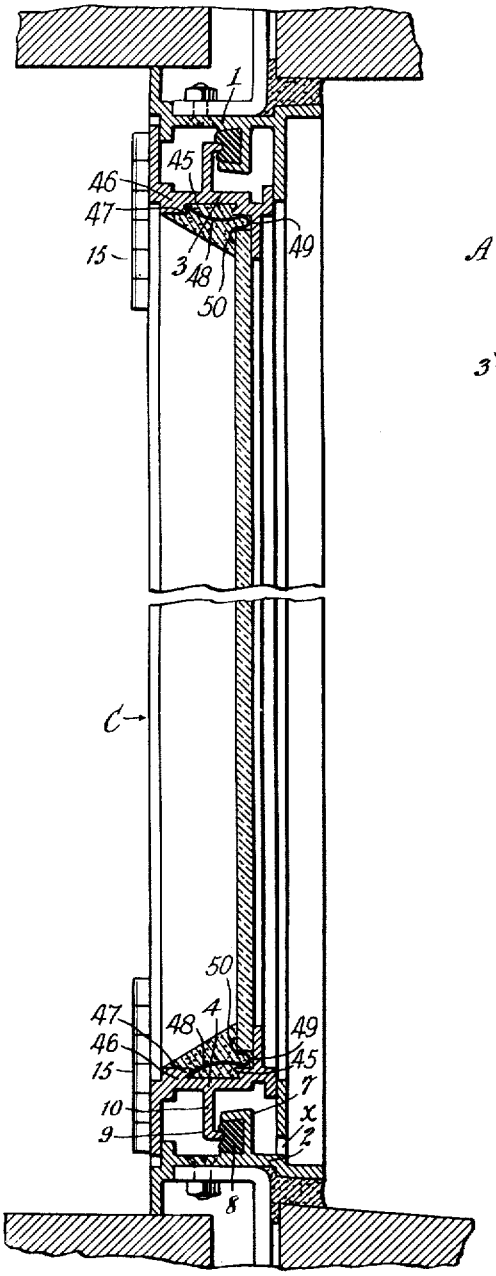
Figure 2 is an enlarged broken view in vertical section on the line 2—2 of Figure 1.
Figure 1:
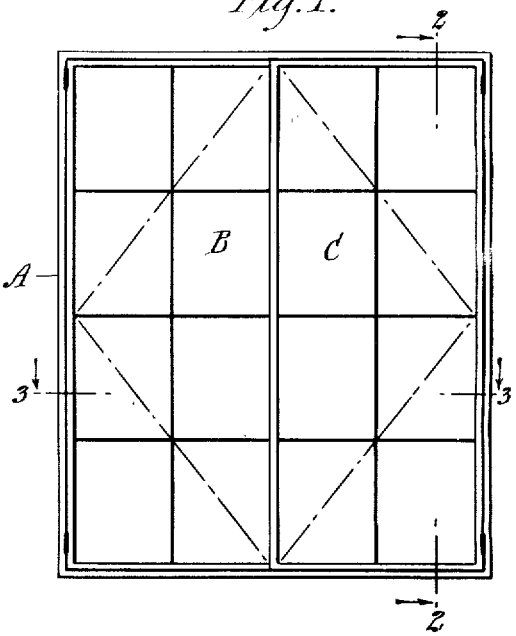
Figure 1 is a diagrammatic view in elevation illustrating a double type of casement window, which gives a full opening between jambs when the sashes are opened.
Figure 4:
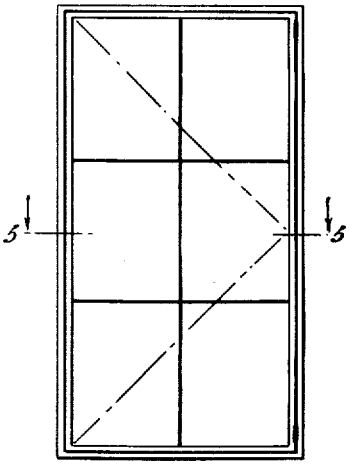
Figure 4 is a view similar to Figure 1 illustrating a single type of hinged window.

Referring more particularly to the construction illustrated in Figures 1, 2 and 3 of the drawings, the letter A is employed to indicate the frame generally, and the reference characters B and C represent the two hinged sashes which, when together, close the opening and which, when swung to open position, leave a free opening as there is no divisional strip between the sashes. This particular construction of full opening is only illustrated, as the invention may be utilized with any type of sash.

The upper frame bar 1, the lower frame bar 2, the upper sash bar 3, the lower sash bar 4, and the meeting sash bars 5 and 6 on the respective windows all comprise what may be termed F-bars; that is to say, they are of the general shape in cross section of the letter F with the meeting bars reversely positioned so as to give metal contacts at both edges of the bars and provide a weather-strip contact intermediate the edges of the bars, as will now be explained.

The frame bars 1 and 2 and the sash bar 3 at their intermediate portions where the shorter webs 7 of the F bars are located are recessed, forming pockets in which weather-strips 8 are located and are engaged by angular extensions 9 on the shorter intermediate webs 10 of the F bars with which they co-operate, thus giving a weather-stripping contact intermediate the edges of the bars as well as metal contacts at the ends of the bars.

The vertical frame bars 11 are also of general F-shape with weather-strips 12 located between the shorter and the longer flanges 13 and 14, respectively, of said bars. The vertical bars 16 of the sashes where they are joined by hinges 15 to the frame bars 11 are of a shape differing from the other bars. These vertical bars 16 of the sashes are somewhat rectangular in form; that is to say, they have webs 17 at their inner ends which engage the bars 11, and on these webs 17 integral webs 18 are provided which are substantially parallel to the main portion of the bar and are provided with angular extensions 19 at right angles to webs 18 which engage the weather strips 12.

In the modification illustrated in Figure 5 of the drawings, the frame bars 20 are of general F-shape supporting between their edges weather-strips 21 which at the hinged side of the sash are engaged by the intermediate web of an F-bar 23 constituting the hinged vertical bar of the sash. The other bars 24 of the sash are in the form of angles with integral webs 25 on the flange of the bar which engage weather-strips 26 carried by the bars 20.

On Figure 6 the frame bars 27 at the hinged side of the sash and the sash bar 28 at the hinged side of the sash are both of general F-shape reversely positioned with an integral web 29 on the bar 28 engaging the weather-strip 30 supported intermediate the edges of the bar 27. The other sash bars 31 of the sash illustrated in Figure 6 are of approximately F shape with the intermediate web 32 thereon located at an acute angle and engaging the weather-strip 33 located in the angles of the angle bars 34 which constitute the frame bars. This sash illustrated in Figure 6 is adapted to swing outwardly instead of inwardly, as is the sash shown in Figure 5.

Figure 7 illustrates a modification in which a removable section 36 is secured by a tenon 37 and mortise 38 to the frame bar 39, and is socketed to receive a weather-strip 40 engaged by an inclined or diagonal web 41 on the sash bar 42. The webs create a gutter on the frame bar for condensation and the sill member of the frame is provided with weep holes $x$ as shown in Figure 2 of the drawings.

Figure 8 shows an arrangement of sash and frame bars 31 and 34 corresponding to the bars indicated at the left of Figure 6, and the only difference between these figures is that instead of the form of weather-strip indicated in the other figures of the drawings a sheet metal weather strip 43 is provided which is engaged by the web 32, and an additional short clip 44 is secured to the bar 31 and also contacts with the web 32 and pulls sash tight to frame rigidly. This clip is located in the middle of the space between top and bottom hinge.

With all forms of bar illustrated and described, it will be noted that there are what may be termed "open" bars; that is, they are not hollow or tubular in form but are either F-shaped or some similar angular shape so that when the frame bars and sash bars meet, with the bars reversely positioned there is a three-point contact, two points being of metal and the third point constituting a weather-strip intermediate the metallic contact. Of course, where the metallic weather-strip is employed there are three metal contacts, but in any event there will always be two bar to bar contacts and one bar to metal contact.

In order that the window glass may be properly positioned and retained within the sash, the sash bars are provided with dovetailed grooves 45 adjacent the glass at one side thereof which result from a flange 46 having an overhanging portion 47. Clips for holding the glass in the sash are provided and each of these clips has a relatively long leg 48 caught in the dovetailed groove 45 and is provided with a resilient loop 49 interposed between the sash and the edge of the glass and with a relatively short leg 50 engaging the face of the glass. Putty is preferably keyed in the dovetailed grooves of the bars of the sash to cover and conceal the clips and for engaging the glass.

Reference is made to our Patents 1,999,208, dated April 30, 1935, and 2,077,808, dated April 20, 1937, the respective applications for which were filed on September 29, 1933, Serial No. 691,554, and April 6, 1935, Serial No. 14,965.

While we have illustrated what we believe to be the preferred embodiment of our invention, it is to be distinctly understood that various slight changes may be made with regard to the form and arrangement of parts without departing from our invention, and hence we do not limit ourselves to the precise details set forth but consider ourselves at liberty to make such arrangements and alterations as fairly fall within the spirit and scope of the claims.

What we claim is:

1. In a window the combination with a sash, glass in the sash, said sash having dove-tailed grooves adjacent the glass at one side thereof, clips holding the glass in the sash, each clip comprising a relatively long leg caught in the dovetail groove, a resilent loop interposed between the sash and the edge of the glass, and a relatively short leg engaging the face of the glass, and putty keyed in the dove-tailed grooves, covering and concealing the clips, and engaging the glass.

2. In a window the combination with a sash, glass in the sash, said sash having dove-tailed grooves adjacent the glass at one side thereof, putty keyed in the dove-tailed grooves and engaging the glass, and clips anchored in the dove-tailed grooves embedded in the putty and engaging the glass.

3. In a casement window, in combination, a frame comprising a side bar having a body portion disposed transversely of the plane of the frame, flanges on said body portion defining with it a recess of tapering width for holding a yieldable weather strip, a weather strip of resilient compressible material mounted in the recess, and a sash hingedly mounted on said side bar and having a stile formed to engage the latter at a plurality of spaced points located at opposite sides of the weather strip, said stile including a flange which extends in the frame plane when the sash is in closed position and which moves into engagement mith the weather strip in a path normal to the weather strip as the sash is moved to closed position.

4. In a casement window, in combination, a frame comprising a side bar having inner and outer flanges of unequal lengths to form sash seats and having means formed on its inner face for housing a weather strip, a weather strip housed in said side bar, and a sash hingedly supported on said side bar, said sash comprising a stile through which the hinge connection is made, said stile having inner and outer seats for engaging respectively the inner and outer flanges of the frame side bar when the sash is in closed position, said stile also including a leg extending transversely of the frame plane which terminates in a lip adapted to lie in the frame plane when the sash is closed, said lip being arranged to have its free edge moved normal to the weather strip to directly compress the same when the sash is moved to closed position.

5. In a casement window, in combination, a frame comprising a side bar having inner and outer flanges of unequal lengths to form sash seats and having means formed between said flanges for housing a weather strip, a weather strip housed in said side bar, and a sash hingedly supported on said side bar, said sash comprising a stile through which the hinge connection to the frame is made, said stile including a flange at the hinge side, a leg extending from said flange and forming a pane seat and having its end remote from the flange formed to fit against one of the seats of the side bar, said stile also including a second leg extending parallel to the first and terminating in an out-turned lip or flange adapted to be thrust normal to the weather strip and directly against it as the sash is moved to closed position.

6. In a casement window, the combination, with a frame, of a pair of sashes hingedly mounted thereon, said sashes including meeting bars each of L shape, said meeting bars jointly enclosing a generally rectangular space when the sashes are closed, a pair of successive flanges extending from an intermediate body portion of one of the bars, the successive flanges being disposed respectively in the sash plane and substantially at right angles thereto and forming with the body portion of the bar a tapering weather strip recess, a weather strip of yielding material housed in the recess, and a web extending from an intermediate body portion of the other meeting bar and terminating in a lip disposed in a plane transverse to the sash plane, said lip being disposed to have its edge move normal to the weather strip as the sash by which it is carried is moved to closed position.

7. In a casement window, in combination, a sash having stiles, a side bar connected to one of the sash stiles for hingedly supporting the sash, a striker bar against which the sash stile remote from the hinge closes, each of said stiles having spaced seats in parallel planes, and said side bar and striker bar each having spaced seats in parallel planes cooperative with the seats of the respective, associated stiles, said side bar including means forming a weather strip housing disposed between the spaced seats thereof, a weather strip in the housing having its exposed face disposed normal to the sash plane, and the associated stile having a flange or lip disposed substantially at right angles to said weather strip face, and the striker bar including means forming a weather strip housing between the spaced seats thereof, a weather strip in the housing having its face disposed parallel to the sash plane, and the associated stile having a flange or lip disposed substantially at right angles to said weather strip face, the arrangement being such that both stile lips move into engagement with the exposed faces of the associated weather strips in directions normal thereto.

8. In a casement window, in combination, a frame, a sash of substantial thickness hingedly mounted on the frame, the hinge axis being disposed adjacent one face of the sash, said frame including a jamb member having an L shaped portion at the side of the sash remote from the hinge, the body of the L being substantially co-extensive in length with the thickness of the sash and having its base disposed at the opposite face of the sash from that at which the hinge is located, a pair of successive, angularly related webs or flanges upon an intermediate portion of the L body, said webs forming with the L body a weather strip housing and constituting, respectively, a base and a side wall of said housing, a weather strip in said housing, said base web extending toward the sash and parallel to the L base, and said side wall web extending away from the L base and inclining away from the sash and toward the L body, the inclination of the side wall web being such that the edge of the sash which seats against the L base is enabled to clear the pocket and the pocket itself is of undercut form in cross section to securely hold the weather strip, and said sash having a flange or web disposed substantially normal to the exposed face of the weather strip and movable into engagement with said face in a path normal thereto.

9. In a casement window, the combination, with a frame, of an inwardly swinging sash hingedly mounted thereon, said frame including a sill member having relatively short and long flanges at the inner and outer sides thereof, respectively, to form sash seats, and having successive flanges formed upon it between said inner and outer flanges to form an inwardly facing housing for a sealing member, a sealing member in said housing and exposed only at the open inner side thereof, said sash having a flange disposed in the sash plane and terminating in an outturned lip for engaging the sealing member, and the relatively long outside flange of the sill member having a weep hole through the base thereof.

10. In a casement window, in combination, a frame, a sash pivotally mounted therein, said sash and frame being formed on all four sides with complementary external recesses to jointly define an enclosed air space when the sash is in closed position, means on all four sides of the frame forming a three sided weather strip receiving channel in an intermediate location between the outer and inner faces of the sash, each channel comprising an outer boundary web extending inward toward the sash to protect the weather strip from the elements, there being a gutter formation completely around the frame between the weather strip channel and the outer face of the sash and means on the sash edges for bearing against the weather strip to provide a continuous sealed joint, for dividing the space between the frame and the sash into two distinct chambers, the channel at the hinge side being open to expose the weather strip to contact with the sash in a plane transverse to the plane of the closed window, and the channel at the other three sides being open at the inner side to expose the weather strip to contact with the sash in a plane parallel to the plane of the closed window.

11. In a casement window, in combination, a frame and a sash, the frame having a jamb member, and the sash having a stile member, said members being hingedly connected and jointly defining a generally rectangular space when the sash is in closed position, means on the jamb member forming a weather strip channel in one corner of said space, a flange on the stile member extending diagonally across said space for engaging a weather strip in said channel, and a clip on the jamb member arranged to be engaged and compressed by the flange as it moves into closed position and to cooperate with the flange in holding the stile to the jamb.

EDMUND PEREMI.
LOUIS TOTH.

No references cited.

Disclaimer

Re. 23,045.—*Edmund Peremi*, Bayside, Long Island, and *Louis Toth*, Flushing, N. Y. WINDOW CONSTRUCTION. Patent dated Oct. 19, 1948. Disclaimer filed June 16, 1951, by the assignee, *General Bronze Corporation.*

Hereby enters this disclaimer to claims 1 and 2 of said patent.

[*Official Gazette July 24, 1951.*]